US011488748B2

(12) United States Patent
Schonewolf et al.

(10) Patent No.: US 11,488,748 B2
(45) Date of Patent: Nov. 1, 2022

(54) INTEGRATED INSULATOR SEAL AND SHIELD ASSEMBLIES

(71) Applicant: Hubbell Incorporated, Shelton, CT (US)

(72) Inventors: John Michael Schonewolf, Augusta, GA (US); Benjamin Joseph Ratliff, Birmingham, AL (US); Jeffrey Miller Butler, Martinez, GA (US); Anthony Michael Seaman, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/344,344

(22) Filed: Jun. 10, 2021

(65) Prior Publication Data
US 2021/0391102 A1 Dec. 16, 2021

Related U.S. Application Data (60) Provisional application No. 63/038,357, filed on Jun. 12, 2020.

(51) Int. Cl.
*H01B 17/30* (2006.01)
*H01B 17/58* (2006.01)

(52) U.S. Cl.
CPC ........... *H01B 17/308* (2013.01); *H01B 17/58* (2013.01)

(58) Field of Classification Search
CPC ...... H01B 17/58; H01B 17/40; H01B 17/308; H01B 17/30
See application file for complete search history.

(56) References Cited

U.S. PATENT DOCUMENTS

| 2,906,809 | A | * | 9/1959 | Drenning | H01B 17/306 174/75 C |
| 3,096,392 | A | * | 7/1963 | Shaback | H01F 27/04 174/31 R |
| 3,652,782 | A | * | 3/1972 | Furusawa | H02G 15/068 174/73.1 |
| 5,214,249 | A | * | 5/1993 | Goch | H01B 17/06 174/209 |
| 5,570,264 | A | * | 10/1996 | Lundquist | H01C 7/123 361/127 |

(Continued)

OTHER PUBLICATIONS

International Search Report dated Sep. 22, 2021 in corresponding International PCT Patent Application PCT/US2021/036780, 2 pgs.

(Continued)

*Primary Examiner* — Timothy J Thompson
*Assistant Examiner* — Rhadames Alonzo Miller
(74) *Attorney, Agent, or Firm* — Ruggiero, McAllister & McMahon LLC (57) ABSTRACT

An integrated insulator sealing and shielding assembly includes a rubber housing having a plurality of radial weathersheds and a tapered end adjacent an endmost radial weathershed. The tapered end has an outer surface with a ring extending outward from the outer surface. The ring is compressible. A metal end fitting is disposed adjacent to the endmost radial weathershed and receives the tapered end. The tapered end is received in a counterbore in the metal end fitting. The counterbore has a sealing surface so that interference of the ring with the sealing surface creates a compressive sealing force to form a seal.

19 Claims, 7 Drawing Sheets

(56) References Cited

U.S. PATENT DOCUMENTS

| | | | | |
|---|---|---|---|---|
| 5,925,855 | A * | 7/1999 | Denndorfer | H01B 17/325 174/212 |
| 6,265,669 | B1 * | 7/2001 | Richards | H01B 17/42 174/176 |
| 6,388,197 | B1 * | 5/2002 | Zhao | H01B 17/325 174/140 CR |
| 6,984,790 | B1 * | 1/2006 | Bernstorf | H01B 17/44 174/140 R |
| 7,709,743 | B2 | 5/2010 | Bernstorf et al. | |
| 8,653,376 | B2 * | 2/2014 | Birrer | H01T 19/02 174/140 CR |
| 2001/0020544 | A1 * | 9/2001 | Nakamura | H01B 17/325 174/138 R |
| 2009/0095506 | A1 * | 4/2009 | Bernstorf | H01B 17/44 174/140 R |

OTHER PUBLICATIONS

Written Opinion dated Sep. 22, 2021 in corresponding International PCT Patent Application PCT/US2021/036780, 4 pgs.

\* cited by examiner

INTEGRATED INSULATOR SEAL AND SHIELD ASSEMBLIES

CROSS REFERENCE TO RELATED APPLICATIONS

This application claims the benefit of U.S. Provisional Application 63/038,357 filed Jun. 12, 2020, the contents of which are incorporated by reference herein.

BACKGROUND

1. Field of the Invention

The present disclosure is related to integrated insulator sealing and shielding assemblies. More particularly, the present disclosure is related to an integrated polymer insulator sealing and shielding assembly that has multiple seals.

2. Description of Related Art

Electrical polymer insulators are used in power transmission and distribution systems to provide mechanical support for conductors and provide electrical insulation between the high voltage conductors and grounded tower structures. A corona protection device is located at the line end and/or the ground end of the insulator and eliminates the corona discharge from the insulator. Elimination of the corona discharge protects the surface of the insulator from polymeric material deterioration caused by electrical stress. Additionally, eliminating the corona discharge reduces television and/or radio noise created by the corona discharge.

One of the problems with conventional corona protection devices is the number of parts required to assemble the corona protection device, thereby increasing the manufacturing costs. In addition, some conventional corona protection devices require secondary operations and corresponding quality checks also increasing manufacturing costs. Another problem of conventional corona protection devices is incorrect installation in the field that can result in reduced performance and durability.

Accordingly, it has been determined by the present disclosure that there is a continuing need for integrated insulator sealing and shielding assemblies that overcome, alleviate, and/or mitigate one or more of the aforementioned and other deleterious effects of prior devices.

SUMMARY

The present disclosure provides an improved insulator sealing and shielding assembly.

The present disclosure also provides the insulator sealing and shielding assembly having a collar assembly disposed between a rubber housing and a metal end fitting.

The present disclosure further provides the insulator sealing and shielding assembly with a rubber housing tapered into a metal fitting to increase the compression connection therebetween.

The present disclosure still further provides the insulator sealing and shielding assembly with a plurality of radial weathersheds disposed along an exterior of the housing and the endmost weathershed adjacent to the collar assembly connected to the hardware.

The foregoing are basically attained by providing an insulator sealing and shielding assembly having a rubber housing with a plurality of weathersheds and a tapered end adjacent the metal fitting. Four sealing surfaces between the counterbore of the collar assembly and the rubber housing secure the connection therebetween creating an integral metal fitting and rubber housing.

An integrated insulator sealing and shielding assembly is also provided that includes a rubber housing having a plurality of radial weathersheds and a tapered end adjacent an endmost radial weathershed. The tapered end has an outer surface with a ring extending outward from the outer surface. The ring is compressible. A metal end fitting is disposed adjacent to the endmost radial weathershed and receives the tapered end. The tapered end is received in a counterbore in the metal end fitting. The counterbore has a sealing surface so that interference of the ring with the sealing surface creates a compressive sealing force to form a seal.

In some embodiments either alone or together with any one or more of the aforementioned and/or after-mentioned embodiments, the rubber housing is made of rubber.

In some embodiments either alone or together with any one or more of the aforementioned and/or after-mentioned embodiments, the sealing surface has a groove in the counterbore of the metal end fitting.

In some embodiments either alone or together with any one or more of the aforementioned and/or after-mentioned embodiments, the groove is sized to receive the ring while the ring applies a compressive sealing force against the groove.

In some embodiments either alone or together with any one or more of the aforementioned and/or after-mentioned embodiments, the sealing surface is a flat surface on the counterbore of the metal end fitting.

In some embodiments either alone or together with any one or more of the aforementioned and/or after-mentioned embodiments, the ring protrudes from the tapered end so that the ring applies a compressive sealing force against the flat surface.

In some embodiments either alone or together with any one or more of the aforementioned and/or after-mentioned embodiments, at least one sealing surface that is a radial compression seal is located between a first frustum of the rubber housing and a second frustum of said counterbore.

In some embodiments either alone or together with any one or more of the aforementioned and/or after-mentioned embodiments, the tapered end has an end that is opposite the endmost radial weathershed, and a portion of the tapered end between the ring and the end forms the first frustum.

In some embodiments either alone or together with any one or more of the aforementioned and/or after-mentioned embodiments, the counterbore forms the second frustum to receive the first frustum of the tapered end.

In some embodiments either alone or together with any one or more of the aforementioned and/or after-mentioned embodiments, the first frustum has a first angle that the tapered end forms with a line that is parallel with a center axis of the rubber housing and the second frustum has a second angle formed by a line parallel with a center axis of the metal housing and the counterbore.

In some embodiments either alone or together with any one or more of the aforementioned and/or after-mentioned embodiments, the first angle is smaller than the second angle to create an increasing compressing force between the rubber housing and the counterbore.

In some embodiments either alone or together with any one or more of the aforementioned and/or after-mentioned embodiments, the tapered end has an end that is opposite the endmost radial weathershed, and the counterbore forms a seal that is a joint between an end of counterbore and the end of the tapered end.

In some embodiments either alone or together with any one or more of the aforementioned and/or after-mentioned embodiments, the tapered end has a raised rib that is a lowermost extension of the rubber housing on a side of the endmost weathershed adjacent the metal housing.

In some embodiments either alone or together with any one or more of the aforementioned and/or after-mentioned embodiments, the raised rib abuts an outer portion of the counterbore to form a sealing surface.

In some embodiments either alone or together with any one or more of the aforementioned and/or after-mentioned embodiments, the seal formed by the ring and the sealing surface is positioned on the tapered end of the rubber housing between the sealing surface formed by the raised rib that abuts the outer portion of the counterbore and another sealing surface that is a radial compression seal located between a first frustum of the rubber housing and a second frustum of said counterbore.

In some embodiments either alone or together with any one or more of the aforementioned and/or after-mentioned embodiments, the tapered end has an end that is opposite the endmost radial weathershed, and the counterbore forms a seal that is the joint between an end of counterbore and the tapered end of the rubber housing.

In some embodiments either alone or together with any one or more of the aforementioned and/or after-mentioned embodiments, the seal formed by the ring and the sealing surface is a third seal, and a first seal formed by a joint between an end of counterbore and the tapered end of the rubber housing, a second seal that is a radial compression seal located between a first frustum of the rubber housing and a second frustum of said counterbore, and a fourth seal that is a raised rib that is a lowermost extension of the rubber housing on a side of the endmost weathershed adjacent the metal housing that abuts an outer portion of the counterbore.

In some embodiments either alone or together with any one or more of the aforementioned and/or after-mentioned embodiments, the third seal is between the second seal and the fourth seal.

In some embodiments either alone or together with any one or more of the aforementioned and/or after-mentioned embodiments, the first seal is adjacent the second seal on a side that is opposite the third seal.

The above-described and other features and advantages of the present disclosure will be appreciated and understood by those skilled in the art from the following detailed description, drawings, and appended claims.

DETAILED DESCRIPTION

Figure 1:
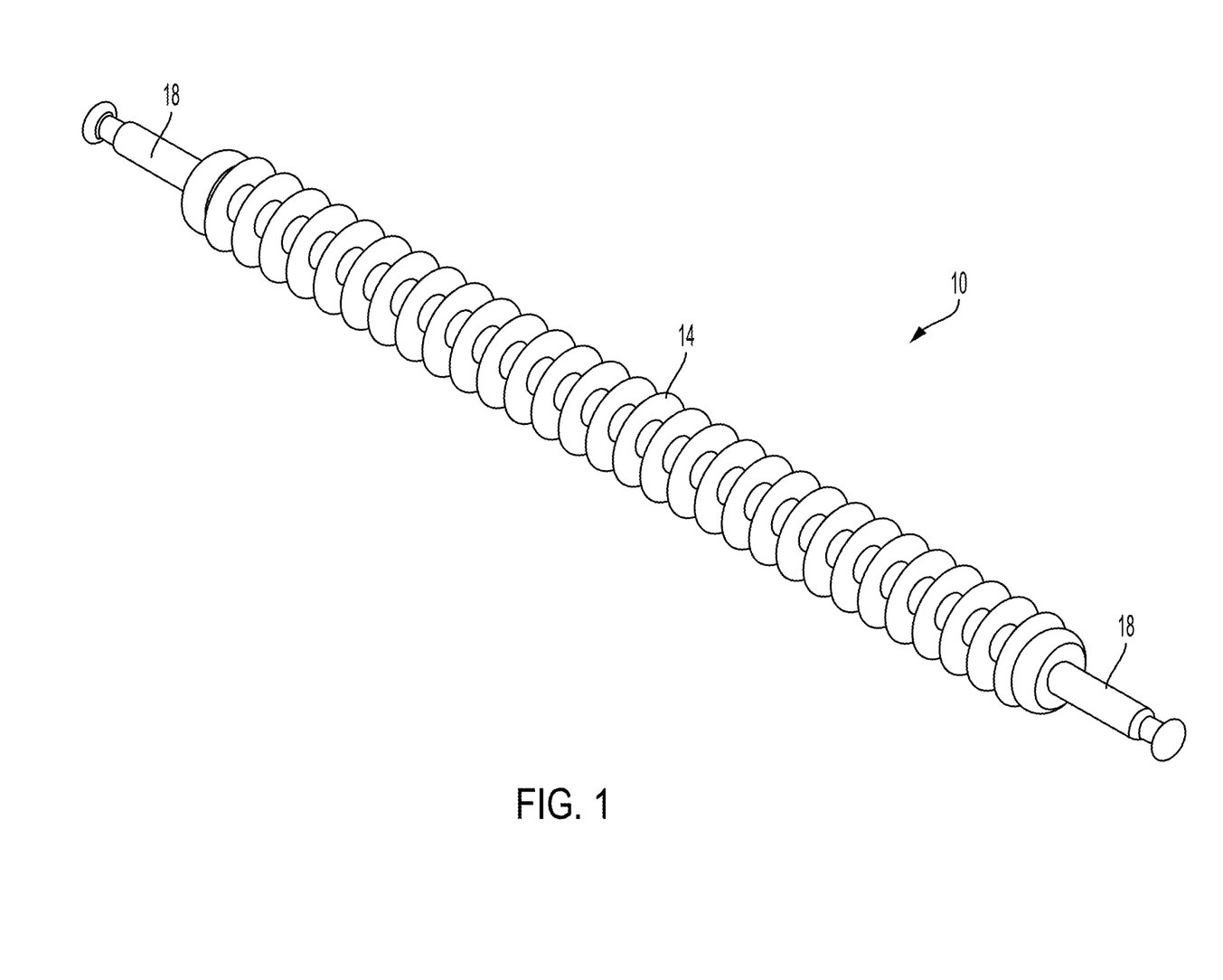
FIG. 1 is a perspective view of an exemplary embodiment of an integrated insulator sealing and shielding assembly.

Referring to the drawings and in particular to FIG. 1, an exemplary embodiment of an integrated insulator sealing and shielding assembly according to the present disclosure is shown and is generally referred to by reference numeral 10 ("assembly 10"). Assembly 10 has a rubber housing 14 and two metal end fittings 18.

Advantageously, assembly 10 includes an integrated sealing and corona shielding system with multiple integrated sealing features to optimize manufacturability through reduced part count and secondary operations over conventional designs. In particular, assembly 10 enables the utilization of advanced manufacturing assembly methods with integrated features to optimize quality and durability.

Figure 2:
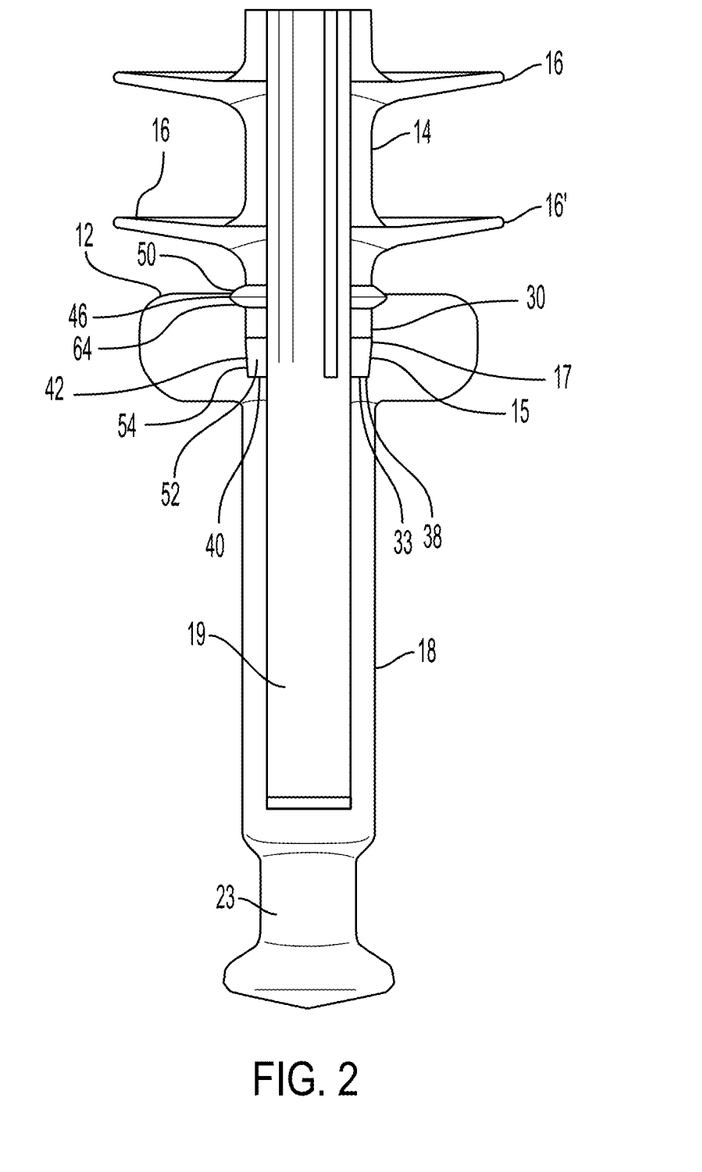
FIG. 2 is a partial cross-sectional side view of FIG. 1 illustrating the sealing interface geometry contained within and not visible in FIG. 1.

Referring to FIG. 2, rubber housing 14 is a cylindrical rubber housing with a plurality of weathersheds 16. Metal end fitting 18 is a metal end fitting with an integrated collar assembly 12. Rubber housing 14 includes a plurality of radial weathersheds 16 distributed about rubber housing 14 in a columnar arrangement. An extended portion 23 of each metal end fitting 18 is disposed on an opposite side of collar assembly 12 relative to rubber housing 14.

Ultimately, rubber housing 14 is adapted to be inserted into and connected to each metal end fitting 18 under pressure. Since each metal end fitting 18 and collar assembly 12 of FIG. 1 is identical, only one will be described in detail. However, metal end fitting 18 can have alternative configurations. In particular, extended portion 23 is shown as a "Ball end fitting" as representing the one of the many variations extended portion 23 can be, but extended portion 23 can be modified to alternatively have one of multiple different fittings (Ball, Y, clevis, etc.) that extends from collar assembly 12. Further, metal end fitting 18 can have different configurations to accommodate different rod diameters of a rod 19 as well with scaled up versions of metal end fitting 18.

Figure 3:
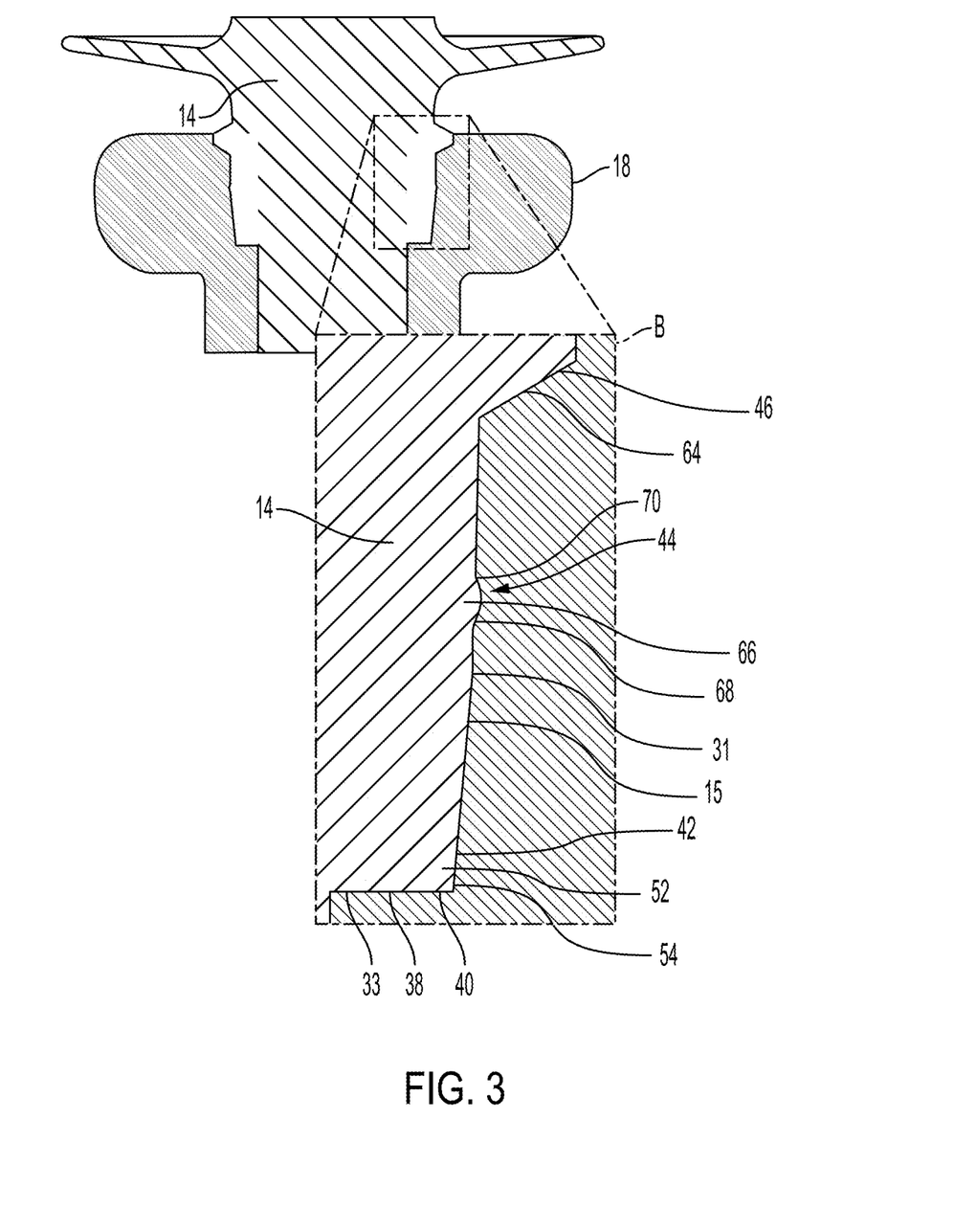
FIG. 3 is an enlarged partial cross-sectional side view of FIG. 1 having a section inside of box B further enlarged.

Collar assembly 12 surrounds and protects an interface between metal end fitting 18 and rubber housing 14, as shown in FIGS. 2 and 3. Collar assembly 12 also includes a counterbore 15 that receives tapered end 30. Counterbore 15 is a passage adjacent to tapered end 30 of rubber housing 14. This helps create the robust connection between collar assembly 12 and rubber housing 14. Counterbore 15 is a main opening between rubber housing 14 and metal end fitting 18. Rod 19 extends through rubber housing 14 and counterbore 15. Rod 19 is a fiberglass rod, and, in particular, an epoxy based electrical grade corrosion resistant (E-CR) fiberglass rod. Rubber housing 14 is direct bonded polymer rubber molded onto rod 19 to form a direct bonded rubber to rod assembly. Rod 19 is related to a shielding portion of assembly 10.

Tapered end 30 of rubber housing 14 is coupled to collar assembly 12 at a first seal 40 that is at a narrow junction between tapered end 30 and counterbore 15. This is a lowermost area of counterbore 15. Tapered end 30 is located adjacent a lowermost point of counterbore 15 for creating at least one sealing surface with collar assembly 12. This junction or first seal 40 between tapered end 30 and collar assembly 12 represents one of four sealing surfaces securing assembly 10. More specifically, the sealing surfaces are disposed between collar assembly 12 and a bottom end 17 of the rubber housing 14. The junction of first seal 40 helps to create a seal between an outer surface of rubber housing 14 and counterbore 15 of metal end fitting 18. Specifically, first seal 40 is the joint between end 38 of counterbore 15 and an end 33 of tapered end 30 of the rubber housing 14.

Figure 4:
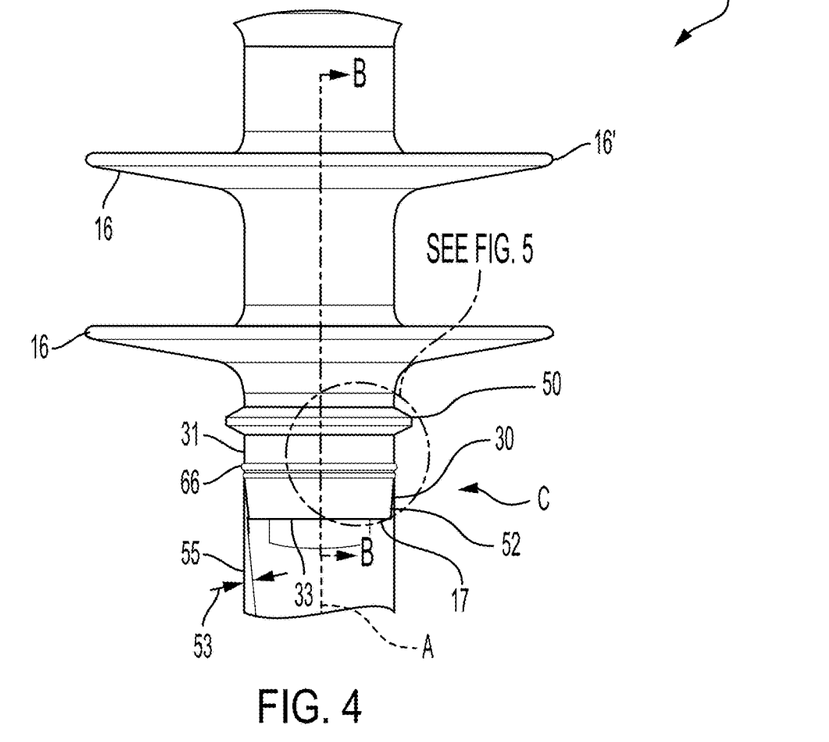
FIG. 4 is a partial side view of a direct bonded rubber to rod assembly of the integrated insulator sealing and shielding assembly of FIG. 1.
Figure 7:
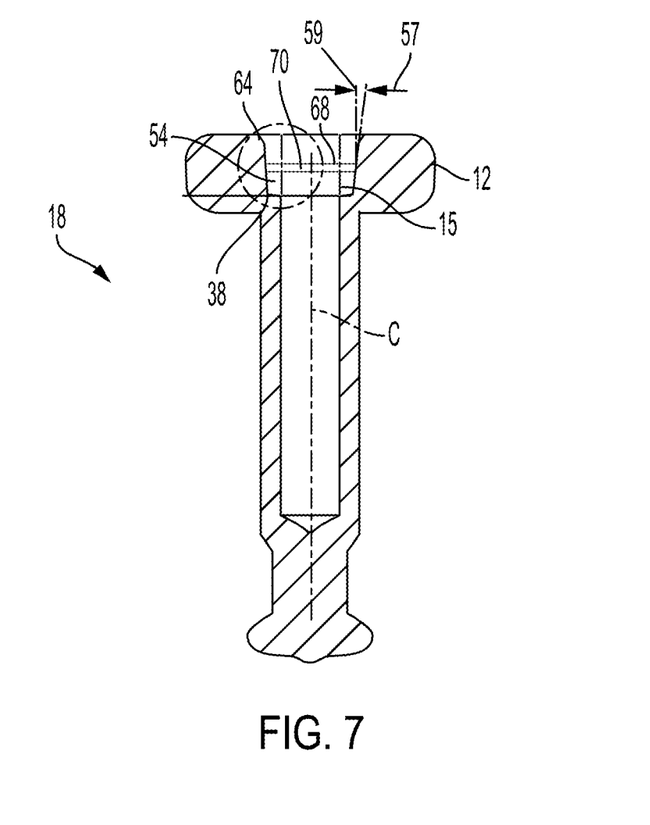
FIG. 7 is a cross-sectional view of a representative metal end fitting.

Still referring to FIG. 2, a second seal 42 is located slightly above first seal 40. Second seal 42 is a radial compression seal created by pushing a first frustum 52 of the rubber housing 14 into a second frustum 54 of counterbore 15 imparting increasing compressing force between rubber housing 14 and the counterbore 15. Referring to FIG. 4, first frustum 52 has a first angle 53 that tapered end 30 forms with a line 55 that is parallel with a center axis A. Referring to FIG. 7, second frustum 54 has a second angle 57 formed by a line 59 parallel with center axis C and counterbore 15. First angle 53 is smaller than second angle 57 to create the increasing compressing force between rubber housing 14 and the counterbore 15 to form a radial compression seal located between first frustum 52 of rubber housing 14 and second frustum 54 of counterbore 15.

Figure 5:
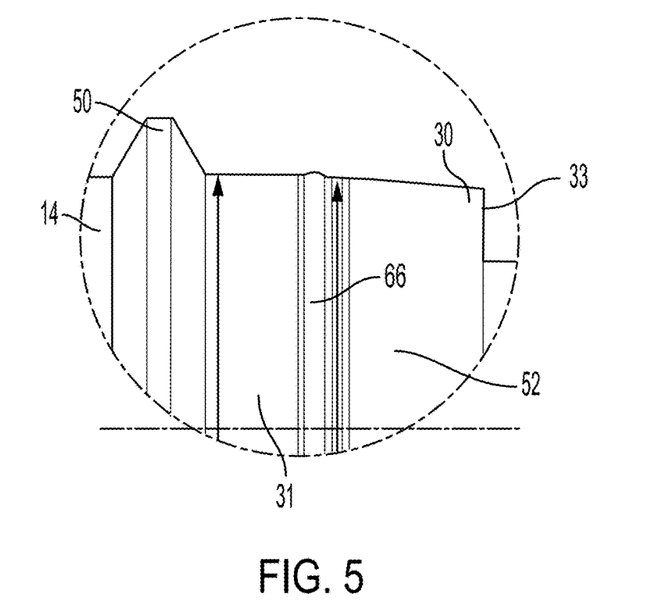
FIG. 5 is an enlarged partial side view of a portion inside circle C of FIG. 4 rotated 90 degrees from FIG. 4.

Referring to FIG. 3, a third seal 44 is located between second seal 42 and a fourth seal 46. Third seal 44 is comprised of a ring 66 formed on rubber housing 14 and a sealing surface 68 of metal end fitting 18. Tapered end 30 of rubber housing 14 has an outer surface 31. Ring 66 is compressible and extends outward from outer surface 31. Referring to FIGS. 4 and 5, ring 66 is an integrated compression sealing protrusion ring molded into the geometry of rubber of rubber housing 14. Ring 66 forms a sealing barrier against sealing surface 68 of metal end fitting 18. The ring seal feature of ring 66 will protrude from the surface of the polymer of rubber housing 14 and interference with sealing surface 68 of metal end fitting 18 will create a compressive sealing force of third seal 44.

Figure 6:
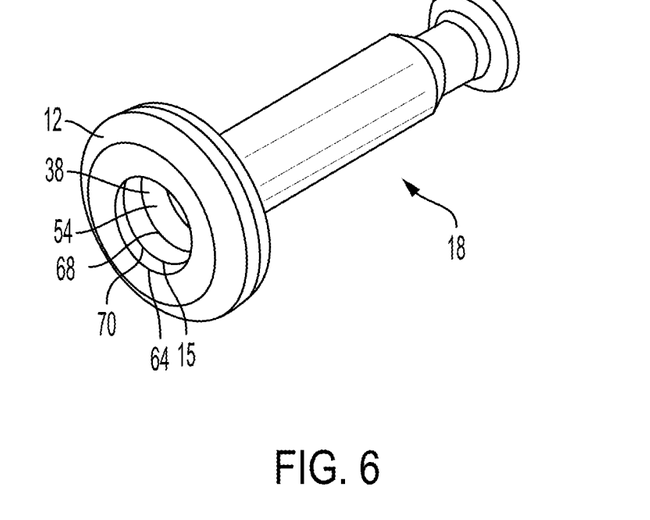
FIG. 6 is a perspective view of a metal end fitting of the integrated insulator sealing and shielding assembly of FIG. 1.
Figure 8:
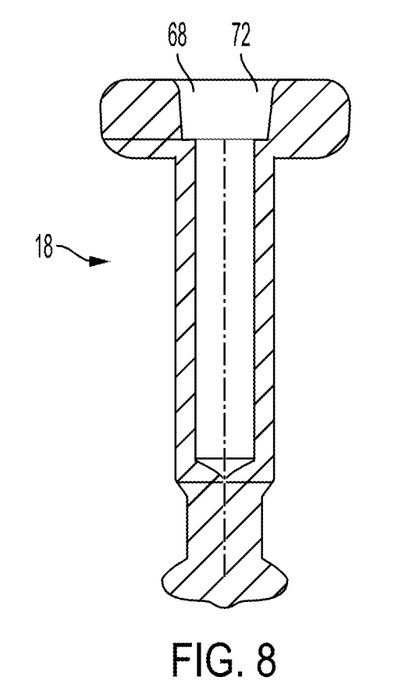
FIG. 8 is a cross-sectional view of a metal end fitting modified from FIG. 7.

Referring to FIGS. 6 and 7, counterbore 15 may contain a groove 70 formed at sealing surface 68. Groove 70 is sized and shaped to receive ring 66 as shown in FIG. 3. Groove 70 mates with ring 66 to maintain ring 66 in place in groove 70 through initial assembly steps while ring 66 applies a compressive sealing force against groove 70 to create third seal 44. However, referring to FIG. 8, metal end fitting 18 can be modified to omit groove 70 so that sealing surface 68 is a flat surface 72. In the modified metal end fitting 18 of FIG. 8, ring 66 protrudes from tapered end 30 so that ring 66 applies a compressive sealing force against flat surface 72 to create third seal 44.

Referring back to FIG. 2, fourth seal 46 is located towards the top of collar assembly 12 at the junction of the rubber housing 14 and an outer portion 64 of the counterbore 15. Fourth seal 46 is the lip seal defined by the intersection of a raised rib 50 on rubber housing 14 and an outer portion of counterbore 15 to provide an initial seal against moisture ingress. Raised rib 50 is the lowermost extension of rubber housing 14 on the side of endmost weathershed 16' adjacent collar assembly 12.

Figure 9:
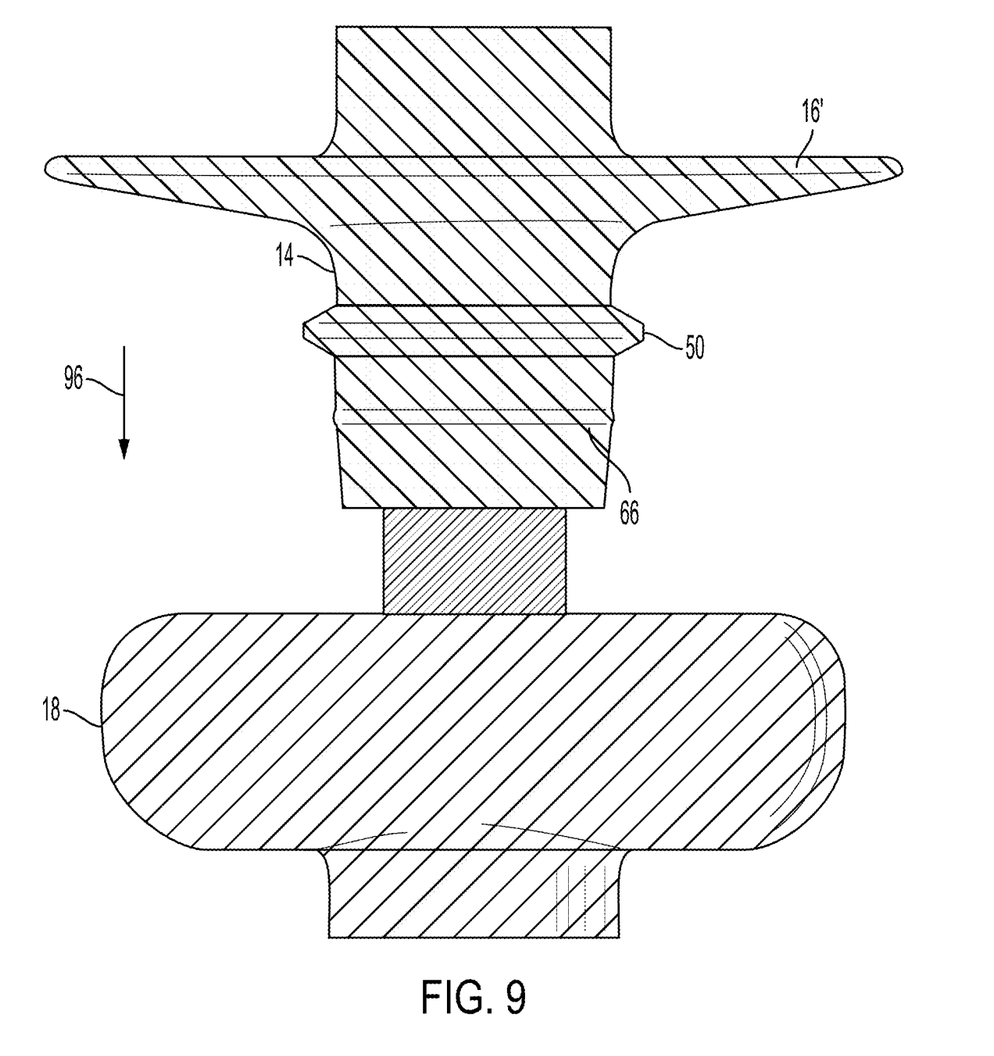
FIG. 9 is a partial side view of the rubber housing disconnected from or prior to the assembly with the metal end fitting.

Referring to FIG. 9, during assembly, rubber housing 14 is moved in a direction 96 into metal end fitting 18 by a force that allows movement of end 33 of tapered end 30 to abut end 38 of counterbore 15 to form first seal 40, first frustum 52 into second frustum 54 to form second seal 42, ring 66 into place to abut sealing surface 68 to form third seal 44, and raised rib 50 to abut outer portion 64 of the counterbore 15 to form fourth seal 46, as shown in FIG. 2, to form assembly 10.

The present disclosure describes one rod diameter and end fitting variation of many that are possible for assembly 10. The present disclosure should not be limited thereby and each variation is covered by the present disclosure.

Advantageously, assembly 10 provides redundancy of sealing features to provide durability and robustness of the critical seal area.

Assembly 10 simplifies the manufacturability of metal end fitting 18 without the requirement of secondary operations such as cross drilling and reduces the assembly part count. Thus, assembly 10 optimizes the design, manufacturability, and quality of insulator sealing and shielding assemblies.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

Integrated insulator sealing and shielding assembly 10
Collar assembly 12
Rubber housing 14
Counterbore 15
Weathersheds 16
bottom end 17
Metal end fitting 18
Rod 19
Extended portion 23
Tapered end 30
Outer surface 31
End 33
End 38
First seal 40
Second seal 42
Third Seal 44
Fourth seal 46
Raised rib 50
First frustum 52
First angle 53
Second frustum 54
Line 55
Second angle 57
Line 59
Outer portion 64
Ring 66
Sealing surface 68
Groove 70
Flat surface 72

What is claimed is:

1. An integrated insulator sealing and shielding assembly comprising:
a rubber housing having a plurality of radial weathersheds and a tapered end adjacent an endmost radial weathershed, the tapered end having an outer surface with a ring extending outward from the outer surface, the ring being compressible;
a metal end fitting disposed adjacent to the endmost radial weathershed and receiving the tapered end, the tapered end being received in a counterbore in the metal end fitting, the counterbore having a sealing surface so that interference of the ring with the sealing surface creates a compressive sealing force to form a seal.

2. The integrated insulator sealing and shielding assembly of claim 1, wherein the rubber housing is made of rubber.

3. The integrated insulator sealing and shielding assembly of claim 1, wherein the sealing surface has a groove in the counterbore of the metal end fitting.

4. The integrated insulator sealing and shielding assembly of claim 3, wherein the groove is sized to receive the ring while the ring applies a compressive sealing force against the groove.

5. The integrated insulator sealing and shielding assembly of claim 1, wherein the sealing surface is a flat surface on the counterbore of the metal end fitting.

6. The integrated insulator sealing and shielding assembly of claim 5, wherein the ring protrudes from the tapered end so that the ring applies a compressive sealing force against the flat surface.

7. The integrated insulator sealing and shielding assembly of claim 1, further comprising at least one sealing surface that is a radial compression seal located between a first frustum of the rubber housing and a second frustum of said counterbore.

8. The integrated insulator sealing and shielding assembly of claim 7, wherein the tapered end has an end that is opposite the endmost radial weathershed, and wherein a portion of the tapered end between the ring and the end forms the first frustum.

9. The integrated insulator sealing and shielding assembly of claim 8, wherein the counterbore forms the second frustum to receive the first frustum of the tapered end.

10. The integrated insulator sealing and shielding assembly of claim 9, wherein the first frustum has a first angle that the tapered end forms with a line that is parallel with a center axis of the rubber housing and the second frustum has a second angle formed by a line parallel with a center axis of the metal housing and the counterbore.

11. The integrated insulator sealing and shielding assembly of claim 10, wherein the first angle is smaller than the second angle to create an increasing compressing force between the rubber housing and the counterbore.

12. The integrated insulator sealing and shielding assembly of claim 1, wherein the tapered end has an end that is opposite the endmost radial weathershed, and wherein the counterbore forms a seal that is a joint between an end of counterbore and the end of the tapered end.

13. The integrated insulator sealing and shielding assembly of claim 1, wherein the tapered end has a raised rib that is a lowermost extension of the rubber housing on a side of the endmost weathershed adjacent the metal housing.

14. The integrated insulator sealing and shielding assembly of claim 13, wherein the raised rib abuts an outer portion of the counterbore to form a sealing surface.

15. The integrated insulator sealing and shielding assembly of claim 14, wherein the seal formed by the ring and the sealing surface is positioned on the tapered end of the rubber housing between the sealing surface formed by the raised rib that abuts the outer portion of the counterbore and another sealing surface that is a radial compression seal located between a first frustum of the rubber housing and a second frustum of said counterbore.

16. The integrated insulator sealing and shielding assembly of claim 15, wherein the tapered end has an end that is opposite the endmost radial weathershed, and wherein the counterbore forms a seal that is the joint between an end of counterbore and the tapered end of the rubber housing.

17. The integrated insulator sealing and shielding assembly of claim 1, wherein the seal formed by the ring and the sealing surface is a third seal, and further comprising a first seal formed by a joint between an end of counterbore and the tapered end of the rubber housing, a second seal that is a radial compression seal located between a first frustum of the rubber housing and a second frustum of said counterbore, and a fourth seal that is a raised rib that is a lowermost extension of the rubber housing on a side of the endmost weathershed adjacent the metal housing that abuts an outer portion of the counterbore.

18. The integrated insulator sealing and shielding assembly of claim 17, wherein the third seal is between the second seal and the fourth seal.

19. The integrated insulator sealing and shielding assembly of claim 18, wherein the first seal is adjacent the second seal on a side that is opposite the third seal.

* * * * *